United States Patent Office 3,578,568
Patented May 11, 1971

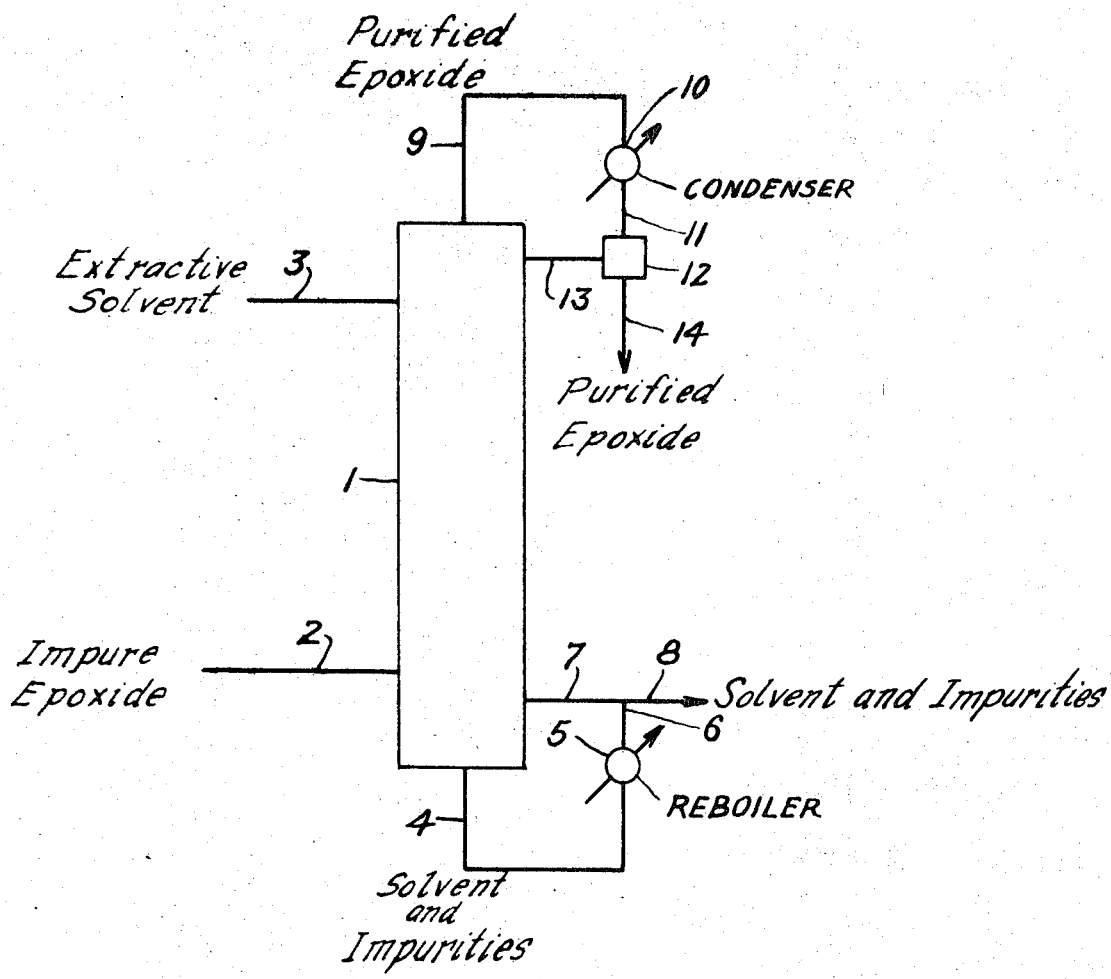

3,578,568
PURIFICATION OF LOW MOLECULAR WEIGHT EPOXIDES BY EXTRACTIVE DISTILLATION WITH A GLYCOL OR GLYCOL ETHER
Thomas A. Washall, Wilmington, Del., assignor to Atlantic Richfield Company, New York, N.Y.
Filed Nov. 29, 1968, Ser. No. 779,738
Int. Cl. B01d *3/34*
U.S. Cl. 203—64                                         4 Claims

ABSTRACT OF THE DISCLOSURE

Method for the purification of $C_3$ to $C_5$ monoepoxides by extractive distillation with ethylene glycol, propylene glycol, ethylene glycol monomethyl ether or diethylene glycol monomethyl ether.

FIELD OF THE INVENTION

This invention relates to a method for the extractive distillation of $C_3$ to $C_5$ olefin monoepoxides using ethylene glycol, propylene glycol, ethylene glycol monomethyl ether or diethylene glycol monomethyl ether to remove oxygen-containing impurities such as acetone, acetaldehyde and methanol.

PRIOR ART

Recently there has been developed a method for the epoxidation of olefins, in particular, propylene to produce propylene oxide utilizing an organic hydroperoxide as the oxidizing agent and a molybdenum-containing catalyst. This method, however, is also applicable to the epoxidation of a wide variety of olefins of higher molecular weight including both mono- and di-olefinic compounds. For example, it can be utilized to produce butadiene monoepoxide and similar compounds. In carrying out this reaction the organic hydroperoxide is, of course, reduced to the corresponding alcohol. There are, however, in addition produced small amounts of other oxygen-containing compounds such as methanol, acetone, acetaldehyde and the like. In general, the alcohol resulting from the reduction of the hydroperoxide can be separated from the epoxide product by ordinary distillation methods, particularly since the organic hydroperoxide employed can be selected to permit this separation. The small amounts of the other oxygenated compounds, however, remain as impurities in the olefin oxide product. For certain of the epoxides, it is extremely important that these impurities be reduced to the low p.p.m. level.

The method of this invention is concerned with the separation of these compounds from $C_3$ to $C_5$ olefin oxides by extractive distillation with ethylene glycol, propylene glycol, ethylene glycol monomethyl ether or diethylene glycol monomethyl ether. No prior art is known which shows this method of purification of low molecular weight olefin epoxides.

SUMMARY OF THE INVENTION

In accordance with this invention oxygen-containing impurities are removed from $C_3$ to $C_5$ olefin monoepoxides by extractive distillation of the epoxide utilizing ethylene glycol, propylene glycol, ethylene glycol monomethyl ether or diethylene glycol monomethyl ether.

The invention is further described by means of the drawing wherein there is shown a schematic outline of one embodiment of the process.

It is an object of this invention to provide a method for the purification of $C_3$ to $C_5$ olefin monoepoxides.

It is another object of this invention to provide a method for the purification of $C_3$ to $C_5$ olefin monoepoxides by extractive distillation.

Other objects of this invention will be apparent from the description of the preferred embodiments which follows and from the appended claims.

DESCRIPTION OF THE PREFERRED EMBODIMENTS

This invention is applicable to the purification of monoepoxides of olefins having from 3 to 5 carbon atoms. Examples of these compounds are propylene oxide, (1,2-epoxy-propane), 1,2-epoxy-butane; 2,3-epoxy-butane; butadiene monoepoxide; 1,2-epoxy-pentane; 2,3-epoxy-pentane; 1,2-epoxy-2-methylbutane; 1,2-epoxy-3-methylbutane; the monoepoxide of the various $C_5$ diolefin isomers and the like.

As has been pointed out in the preparation of these epoxides there is produced various impurities consisting of such compounds as water, low molecular weight alcohols, low molecular weight ketones, low molecular weight aldehydes and the like. Examples of these low molecular weight compounds are methanol, acetone and acetaldehyde, respectively. These compounds are present in small amounts and since, in general they boil in the same range as the epoxide or form constant boiling mixtures therewith, they are either difficult or impossible to separate by ordinary distillation. These impurities, however, can be removed substantially completely by the method of this invention.

The solvents used in the extractive distillation, as have been described, are ethylene glycol, propylene glycol, ethylene glycol monomethyl ether or diethylene glycol monomethyl ether. Higher diols or higher glycol ethers do not provide sufficient selectivity for the removal of the aforementioned impurities and, therefore, are not included as the extractive distillation solvents suitable for use in this invention.

The method of this invention can be carried out either in a batch system or a continuous system. In the batch system the impure olefin epoxide is introduced into a vessel which can be heated and which is fitted with a fractionation column into which the extractive solvent can be introduced. The extractive solvent is introduced into the fractionating column at a point near the top of the column so that preferably there is some fractionation above the point of introduction in order to prevent carry-over of the extractive solvent with the epoxide. Reflux is also provided. The extractive solvent is introduced at a temperature approximately the same as the boiling point of the mixture in the vessel. The amount of extractive solvent introduced into the column is preferably such that it will occupy between 15 and 50 percent of the vapor space in the column, i.e. the vapor in the column will be between about 15 and 50 mole percent extractive solvent. Although higher amounts can be used they have not been found to be advantageous and, in general, amounts ranging between about 30 percent and 50 percent are completely suitable and satisfactory.

In the batch process the impure olefin epoxide mixture is heated to boiling and the solvent is introduced into the column at a rate such that the desired quantity is contained in the column. The epoxide substantially free of impurities is withdrawn overhead from the column while the solvent and impurities accumulate in the distillation vessel until finally all of the epoxide or substantially all has been distilled overhead. A reflux ratio of from 1:1 to 10:1 or higher can be employed. A ratio of 2:1 to 5:1 generally is sufficient.

In the continuous system the feed consisting of the impure olefin epoxide mixture is introduced into a fractionation tower near the bottom of the tower and the extractive solvent is introduced into the tower near the top. The bottom of the tower is generally provided with a reboiler system to provide the necessary heat for fractionation. The bottoms from the tower consisting of the solvent and the impurities such as methanol, acetone, acetaldehyde and the like as has been described, passes through the reboiler where it is heated by indirect exchange or by direct heat and a portion of the bottoms liquid thus heated and partially vaporized is recycled to the lower part of the column. The remaining portion consisting of the impurities and solvent is withdrawn. The overhead vapors consisting of the olefin epoxide substantially free of impurities is withdrawn from the tower and condensed. If it is desired in accordance with conventional practice a portion of the condensate can be returned as recycle or reflux to the top of the tower. Such a system is well known in accordance with conventional engineering practices in extractive distillation processes and many modifications thereof are known and can be employed.

One embodiment of the foregoing description of the continuous system is shown in the drawing wherein numeral 1 refers to the fractionation tower or extractive distillation zone which is provided with conventional trays, packing or the like. The impure olefin epoxide mixture is introduced into tower 1 through line 2, and the extractive solvent is introduced into tower 1 through line 3. The bottoms from the tower consisting of the impurities and the solvent is removed through line 4 and passed through reboiler 5 wherein the bottoms are heated. Heated liquid is passed through line 6 and a portion is returned through line 7 to the tower 1 to provide the heat necessary for the distillation. The remaining portion of the bottoms is removed through line 8. The overhead vapors consisting of the olefin epoxide is withdrawn from the tower through line 9 and passed to condenser 10 and from condenser 10 through line 11 to receiver 12. A portion of the condensate can be returned to the top of the tower 1 through line 13, as reflux, and the remainder of the condensate is withdrawn from the receiver 12 through line 14 as purified product.

The following example is provided to illustrate the invention in greater detail and to demonstrate its utility. It will be understood, however, that the invention is not to be construed as being limited thereto.

EXAMPLE

A run was carried out in which 104 grams of impure propylene oxide consisting of 99+ weight percent propylene oxide, 48 p.p.m. methanol, 100 p.p.m. actaldehyde and 100 p.p.m. acetone (p.p.m. is parts per million by weight) was charged to a flask provided with a Todd column modified so that solvent could be introduced into the column near the top of the column. Ethylene glycol at a temperature of approximately 35° C. was introduced into the top of the column at a rate of 1.6 mls. per minute. A 2:1 reflux ratio was employed with a distillate rate of 0.67 ml. per minute. An overhead cut was taken weighing 80.2 grams consisting of 77.1 weight percent of the charge. The overhead composition consisted of 99+ weight percent propylene oxide, less than 5 p.p.m. acetaldehyde, less than 5 p.p.m. methanol, and 12 p.p.m. acetone. Thus it will be seen that substantially pure propylene oxide was obtained.

Similar runs were carried out utilizing diethylene glycol monomethyl ether as the extractive solvent and also using other olefins such as butadiene monoepoxide and the like. In all cases substantially pure olefin oxide was obtained.

As many possible embodiments can be made of this invention without departing from the broad scope thereof, it is to be understood that all matter herein set forth is to be interpreted as illustrative and not as unduly limiting the invention.

I claim:
1. The method of separating water, methanol, acetone, and acetaldehyde from monoepoxides of olefins having from 3 to 5 carbon atoms and admixed with said impurities which comprises contacting said monoepoxide containing said impurities in a fractional distillation zone with a solvent selected from the group consisting of ethylene glycol, propylene glycol, ethylene glycol monomethyl ether and diethylene glycol monomethyl ether, the amount of said solvent in said fractional distillation zone being in the range of from 15 to 50 percent of the vapor space in said zone removing said epoxide from the top of the fractional distillation zone and said solvent and impurities from the bottom of the fractional distillation zone.

2. The method according to claim 1 wherein the solvent is ethylene glycol.

3. The method according to claim 1 wherein the solvent is diethylene glycol monomethyl ether.

4. The method according to claim 1 wherein the epoxide is propylene oxide.

References Cited
UNITED STATES PATENTS

| | | | |
|---|---|---|---|
| 3,265,593 | 8/1966 | Leis et al. | 203—64 |
| 3,351,635 | 11/1967 | Kollar | 260—348.5 |

WILBUR L. BASCOMB, Jr., Primary Examiner

U.S. Cl. X.R.

260—348